United States Patent [19]

Gorman

[11] 4,281,694

[45] Aug. 4, 1981

[54] CUTTING GUIDE FOR A ROUTER OR SIMILAR TOOL

[76] Inventor: Thomas E. Gorman, 19 Eames St., North Reading, Mass. 01864

[21] Appl. No.: 91,151

[22] Filed: Nov. 5, 1979

[51] Int. Cl.³ .............................................. B27C 5/10
[52] U.S. Cl. .................................. 144/134 D; 33/26; 83/574; 83/745; 144/136 C; 409/182
[58] Field of Search .................. 33/26 R, 27; 83/574, 83/743, 744, 745; 144/136 C, 134 D, 323; 409/182

[56] References Cited

U.S. PATENT DOCUMENTS

| | | | |
|---|---|---|---|
| 37,791 | 2/1863 | Schuyler | 269/68 |
| 170,267 | 11/1875 | Hudson | 269/68 |
| 1,855,945 | 4/1932 | Denyer | 83/745 |
| 2,825,370 | 4/1958 | Fieber | 83/743 |
| 2,911,017 | 11/1959 | Holder | 83/574 |
| 3,741,063 | 6/1973 | Bretthauer | 83/745 |
| 3,791,260 | 2/1974 | Ambler et al. | 144/134 D |
| 4,023,273 | 5/1977 | Treleaven | 83/745 |
| 4,050,340 | 9/1977 | Flanders | 83/743 |
| 4,065,114 | 12/1977 | Pennington | 83/745 |
| 4,095,632 | 6/1978 | Raulinaitis | 144/136 C |
| 4,109,901 | 8/1978 | Akin | 83/745 |
| 4,155,383 | 5/1979 | Welliver | 144/134 D |
| 4,215,731 | 8/1980 | Maynard | 144/134 D |

Primary Examiner—W. D. Bray

[57] ABSTRACT

A power tool cutting guide for making plural parallel cuts or arcuate cuts in a workpiece has a member, rotatable within the circular track of a frame, which can be fixed in any angular orientation relative to the workpiece, a guide assembly joined to the rotatable member on which a tool support plate can slide between positionable stops, and a ratchet arm with an attached pawl which engages the serrations in a rack so as to incrementally move a workpiece along a fence. The guide also features a spring-urged retention arm which holds the workpiece firmly against the fence during cutting and means for automatically withdrawing the cutting tool from the workpiece surface upon completion of the cut.

12 Claims, 7 Drawing Figures

4,281,694

CUTTING GUIDE FOR A ROUTER OR SIMILAR TOOL

BACKGROUND OF THE INVENTION

This invention relates generally to an apparatus for guiding the movement of a power cutting tool relative to a workpiece and more specifically to an apparatus which facilitates formation in a workpiece of arcuate cuts, rectilinear cuts, or a series of parallel, regularly-spaced, angled cuts.

A router is a commonly available piece of power equipment which is used for cutting precise edges and grooves in a workpiece. Although there are guide mechanisms known in the prior art which permit a straight cut or groove to be made in a workpiece, problems arise when one is faced with the task of making a plurality of identical grooves in parallel along the length of the workpiece, an array of identically positioned grooves in a sequence of workpieces, or arcuate cuts. In a typical straight line cutting guide, the workpiece is clamped securely to the guide and the required cut is made. In order to make additional cuts parallel to the first, the workpiece must be loosened within the guide for each cut and be manually measured, marked and repositioned, in order to line up properly with the preceding cut. This procedure is time consuming and subject to operator error as each cut is essentially a distinct operation, and the opportunity exists for a cumulative error to be introduced, which results in non-parallel or irregular spacing.

Conventional guides for making angular cuts in a workpiece usually are limited as to the range of angles relative to the edge of the workpiece which can be achieved. Typically a range of only 90 degrees, or 45 degrees on either side of the perpendicular, is standard. Thus, if grooves must be cut at very acute angles to the edge of the workpiece, oftentimes the guide may be of no use. Typical examples of applications in which a set of evenly spaced, accurately cut parallel grooves are required is in the fabrication of louvered doors, crib gates, or other pieces of woodwork which have evenly spaced slats or rails. The precision of the spacing and the parallelism of the grooves have a pronounced effect on the aesthetics of the finished product, and the conventional method of continually repositioning the workpiece within the guide is counterproductive to the required precision. In the case of louvered doors where two oppositely facing support pieces have corresponding sets of equally spaced grooves, misalignment may mean that insertion of the slats in the opposing support pieces may become impossible.

U.S. Pat. Nos. 3,741,063 to Bretthauer, 4,109,091 to Akin, 4,050,340 to Flanders, and 2,825,370 to Fieber are examples of previously known guides which permit single angular cuts to be made in a workpiece. However, none provide for controlled movement of the workpiece relative to the guide so as to create a series of such cuts in parallel fashion. Also, each discloses less than 360° accessibility to the workpiece.

U.S. Pat. No. 4,023,273 to Treleaven does teach a device for making circular cuts, but it requires establishment of a pivot point in the workpiece itself. This means that if only a circular groove were to be made, the workpiece would remain marred by a hole at the center of the groove. Also, the circle is limited to a minimum diameter.

Therefore it is an object of the present invention to adapt a cutting tool to make precise rectilinear or arcuate cuts within a workpiece at any orientation relative to the workpiece and to do so in a simple, efficient, and reliable manner. Another object is to provide a guide which allows a cutting tool to produce accurately a series of parallel, regularly-spaced grooves or cuts within a workpiece or a succession of workpieces in a repeatable manner. Another object is to provide apparatus for guiding multiple rectilinear and parallel cuts in a workpiece which can be adapted easily to a variety of power cutting tools including routers and saber saws. Another object is to provide a guide apparatus for guiding multiple, regularly spaced arcuate cuts and for cutting circles. Yet another object is to provide a means for making circular cuts or grooves in a workpiece in a continuous fashion, without repositioning or marring the workpiece.

SUMMARY OF THE INVENTION

The present invention resides in a cutting tool guide having a frame for use on a workbench or similar work surface and a rotatable member which rotates on or within a circular track in the frame. A tool support plate cooperates with a rectilinear guide rail attached to the rotatable member, and rotatable in conjunction with it, to define a guide assembly. The guide member or rail has positionable mechanical stops which define the limits to which the tool support plate and an attached cutting tool can be moved relative to the guide rail. In one embodiment, the guide assembly is hinged to the rotatable member so that it can be elevated to disassociate the tool from its cutting position. In another embodiment, the tool support plate is carried on a plurality of interfitting pins and barrels so that it can be moved between a cutting position and a position spaced from the workpiece. In yet another embodiment, the tool support plate is carried on a plurality of scissor braces which allow movement to and from the cutting position. Preferably, spring means for biasing the tool support plate and associated cutting tool away from the cutting position is also included.

In preferred embodiments a fence, fixable relative to the frame, comprises a straight edge against which a workpiece can be slid so as to move the workpiece relative to a blade or bit of the cutting tool. A serrated rack may be fixed to the workpiece so that a ratchet arm carrying a spring-loaded pawl can engage the serrations to incrementally move the rack and the attached workpiece along the fence. The ratchet arm pivots on a plate fixed to the work surface or other suitable support. Variable pivot holes and/or adjustable stops define the start and stop point of the ratchet arm and thereby define the distance moved by the workpiece during any one movement of the ratchet arm. To make a set of parallel grooves, all that must be done is to engage the cutting tool bit in the surface of the workpiece, move the cutting tool fixed to the tool support plate between the stops on the guide rails, lift the cutting tool bit from the workpiece, pivot the ratchet arm fully so as to incrementally move the workpiece along the fence, and repeat the cuts at each of these incremental positions.

The frame may be inscribed with suitable indicia which allow the setting of any desired angular orientation of the guide assembly relative to the frame, thereby to establish a precise angular orientation relative to the movable workpiece. Means are provided to fix the rotatable member at the desired angular position to prevent shifting during the cutting operation. There is also a spring loaded retention device which rides against the edge of the workpiece and forces it against the fence to hold the workpiece firmly during cutting, but which does not prevent movement of the workpiece along the fence when it is being incremented from one position to the next.

Embodiments of the invention provide a 360° freedom of rotation of the guide assembly relative to the frame to permit grooves to be made at an acute angle to the edge of the workpiece. Also, the tool support plate can be locked in the cutting position so that once the cutting bit has engaged the workpiece, the guide assembly can be rotated 360° without removing the cutting tool from the workpiece, thereby defining a perfect circle of a selected diameter within the workpiece in one continuous motion.

Other objects, features and advantages of the invention will appear from the following description of preferred embodiments and from the drawings wherein like reference characters in the respective figures indicate corresponding parts.

DESCRIPTION OF A PREFERRED EMBODIMENT

Figure 1:
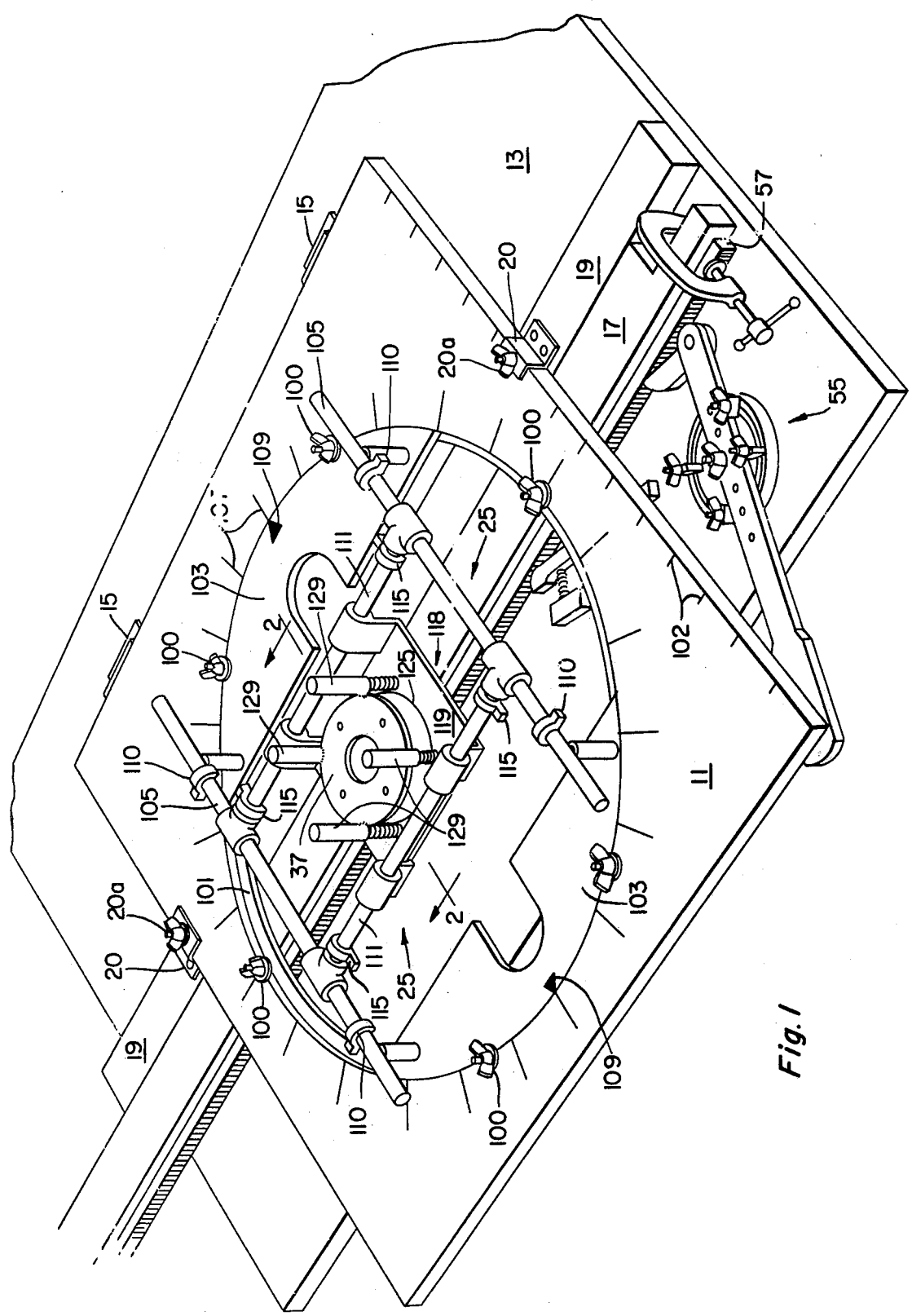
FIG. 1 is a perspective view of an embodiment of a cutting guide in accordance with the present invention.

Referring to FIG. 1, a frame 11 is attached in an elevated position by offset hinges 15 to an underlying support plate 13. The support plate will typically comprise the flat surface of a table, work bench, or other appropriate work surface. Surface 13 also serves to support a workpiece 17, a rack 57 which is temporarily attached to the workpiece 17, and a pawl and lever mechanism 55. A fence 19 is attached to the frame 11 by means of pinch clamps 20 and their associated wing nuts 20a. By loosening the wing nuts, one may position and align the fence 19 at a desired location along opposite sides of the frame 11, assisted by reference marks 102.

A circular opening 97 in the frame 11 has a track in the form of an inwardly disposed groove 101 extending about its periphery. A guide assembly, designated generally at 25, comprises rotatable members 103 having outer edges whose curvature matches that of the opening 97. The rotatable members have flanges 102 (see FIG. 5) which interfit with the groove 101, and can rotate a full 360 degrees within the opening 97. Various mechanical arrangements which allow the guide assembly to rotate within the frame may be used as an alternative to the groove and flange arrangement shown. Degree markings 107 inscribed around the opening 97, together with indicators 109 fixed to the rotatable members 103, show the angular orientation of the guide assembly relative to the workpiece 17. Thumbscrews 100 and their associated washers, or an equivalent mechanism serve to fix the guide assembly 25 in a selected angular orientation relative to the frame. Parallel rods 105 and transverse rods 111 constitute a carriage mounted on the moveable members 103 for supporting a tool mounting 118. The tool mounting can slide along parallel rods 111 between adjustable stops 115. In turn, the mounting and rods 111 can slide together along rods 105 between adjustable stops 110.

In an alternative construction (not shown) the tool mounting 118 is attached for sliding movement directly to rods 105. In such a case, the rotation of the moveable members 103 and the linear movement of the tool mounting 118 along the rods 105 still will allow adequate access to the workpiece at a wide range of positions and angles.

Figure 2:
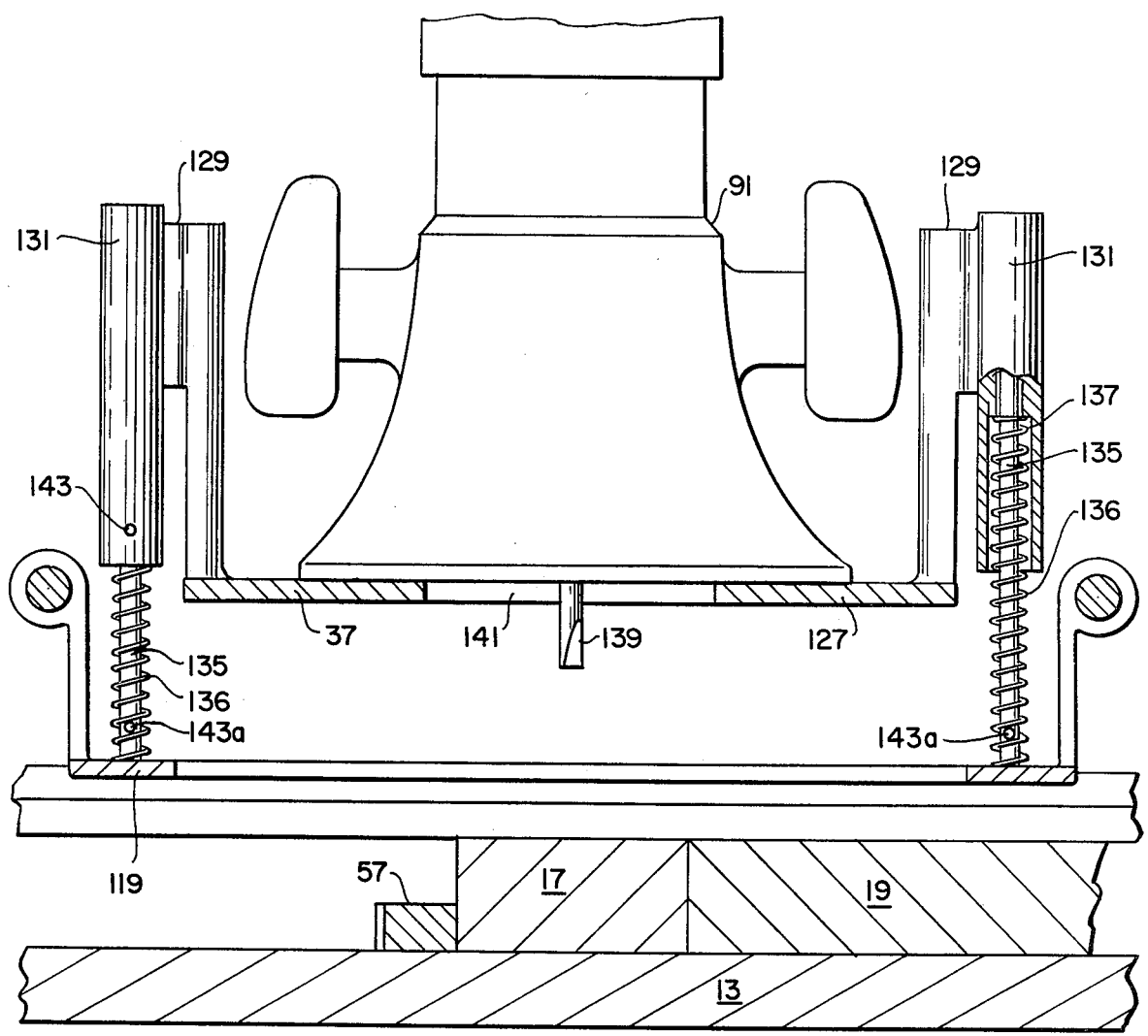
FIG. 2 is a fragmentary detailed view, partially in section, of one tool support plate suspension system useful with the embodiment of FIG. 1, as viewed in the direction 2—2 of FIG. 1, with a router mounted thereon.
Figure 3:
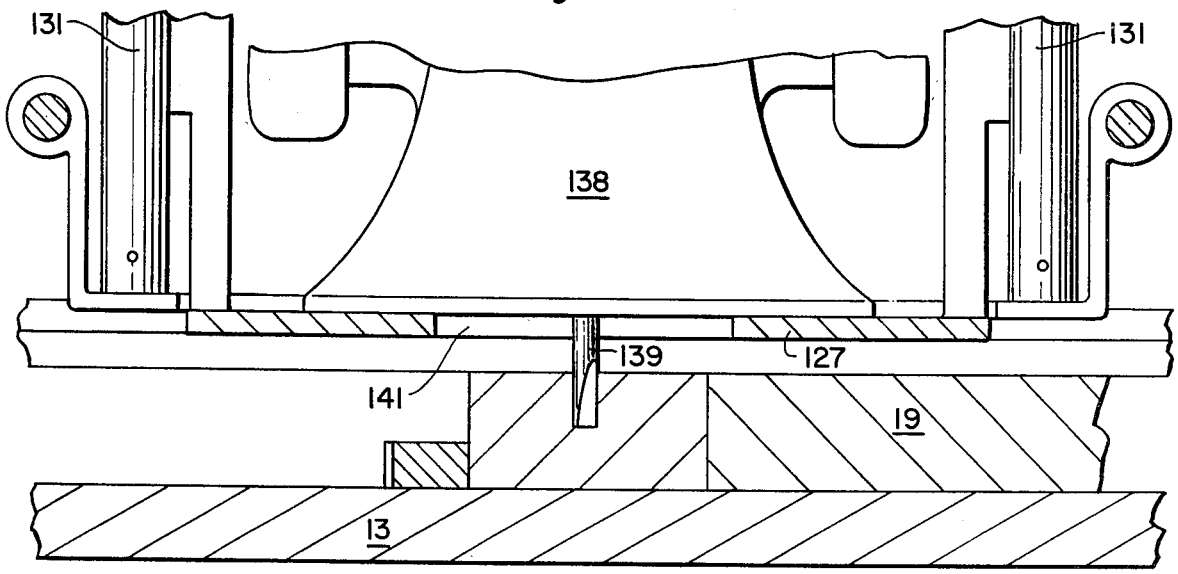
FIG. 3 is a fragmentary detail view, similar to FIG. 2, showing the alignment of the components during a cutting operation.

The tool mounting 118 comprises a platform 119 having a central circular aperture 125, and a tool support plate 37. Plate 37 is suspended above the platform 119 by four outriggers 129, shown in more detail in FIG. 2. The outriggers 129 each comprise a barrel-like section 131, which fits over both a corresponding pin 135 projecting upwardly from the platform 119, and a compression spring 136 which surrounds the pin. Inner lip 137 within the bore of the barrel-like section 131 rests atop the spring 136. The springs 136 are compressed until they exert enough upward force to counterbalance the weight of the platform and a mounted power tool 91. The spring constant is such that in the rest position a cutting bit 139 of the tool 91, which protrudes downwardly through a hole 141 in the support plate 37, is removed from the surface of the workpiece 17. However, as shown in FIG. 3, downward pressure supplied by an operator pushing on the router, moves the support plate down through the aperture 125 in the platform 119 until the bit 139 is in a cutting position. This arrangement prevents accidental gouging of the workpiece surface, and also facilitates perpendicular "plunge cuts" into the surface. In other words, the four-point suspension permits the axis of the router bit to be aligned perpendicular to the workpiece surface from the first instant the bit contacts the surface.

Again referring to FIG. 2, two or more of the barrel-like sections 131 and the pins 135 are provided with matching alignment holes 143, 143a capable of accepting pins (not shown) so as to lock the support plate in a downward position and maintain constant contact between the router bit and the workpiece 96. With such an arrangement, circular grooves can be cut by bringing the stops 115 and the stops 110 snuggly against both sides of the rods 111 and the tool mounting 119, respectively, to prevent any movement therealong, and then by rotating the pivot pieces 103 within the frame 11 a full 360 degrees. The bit thus will be moved through a circular path concentric with the circular opening 97 in the frame 11. The minimum diameter of such a circular groove is limited only by the diameter of the cutting bit 139.

Figure 4:
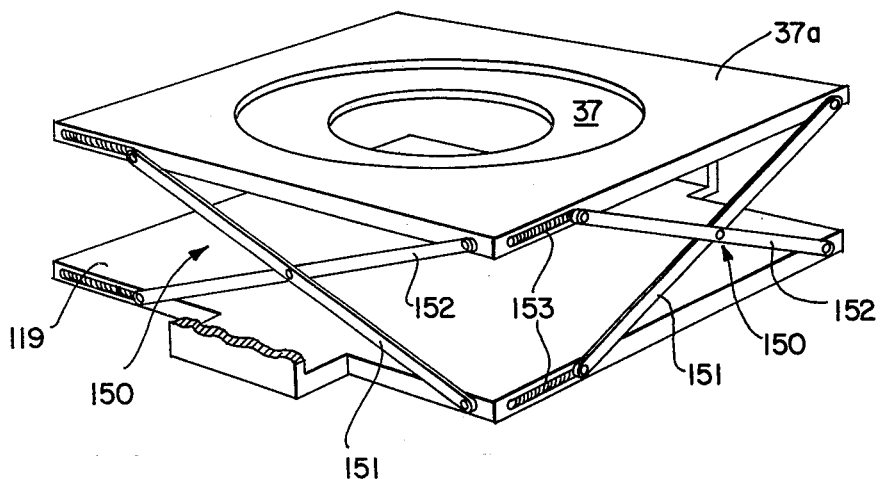
FIG. 4 is a detailed view of the scissors-type tool support plate suspension system useful with the embodiment of FIG. 1.

Referring to FIG. 4, an alternative tool support plate suspension system is shown. In this design support plate 37 comprises a recessed portion of a larger plate 37a, which is mounted on platform 119 by means of four scissor braces 150. Each brace comprises a pair of elongate support members 151, 152. Each support member is hinged at one end and is slideably engaged in a slot 153 at the opposite end. Springs 154, disposed in each slot 153, bias support plate 37 toward the elevated position illustrated. When a cutting tool (not shown) is mounted on the support plate 37, downward pressure positions the recessed support plate 37 and the attached power tool at a cutting position wherein plate 37 fits within an aperture in plate 119.

Figure 5:
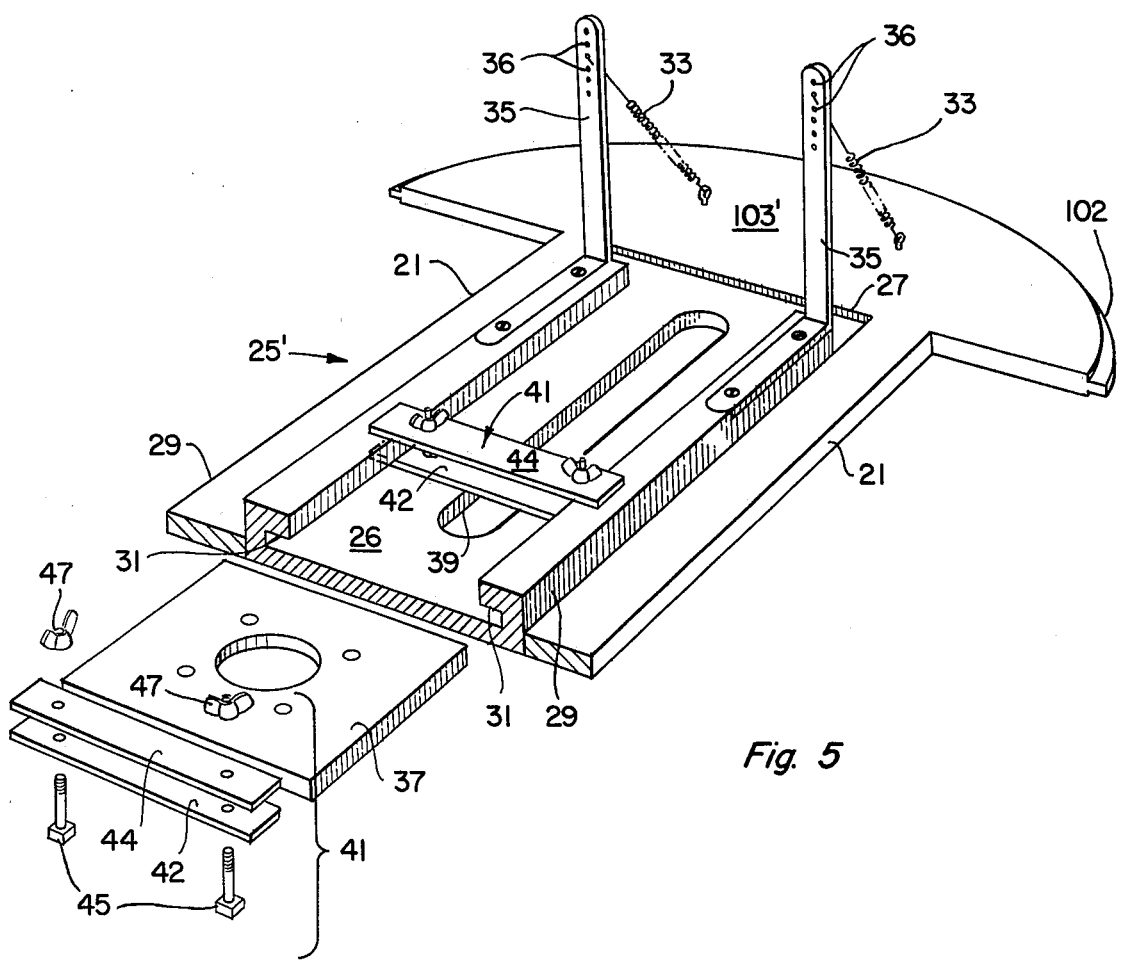
FIG. 5 is a detailed view, partially cut away and partially exploded, of a second form of guide asssembly useful with the frame and moveable member of the embodiment of FIG. 1.

Referring to FIG. 5, an alternative form of the guide assembly is shown. It comprises a generally rectangular structure 25' mounted on rotatable member 103' with hinges 27. Braces 35 and associated springs 33 provide an upward force on the guide assembly 25' to counterbalance the weight of a power tool mounted thereon, thereby assisting an operator in moving the guide assembly between a position elevated above the workpiece and the cutting position shown. A plurality of spring attachment sites 36 allow adjustment of the spring tension. Slats 21 connect the illustrated rotatably member 103' to its counterpart rotatable member (see FIG. 1). When in the cutting position, the end of the guide assembly 25' opposite hinges 27 rests on a lip (not shown) integral with the rotatable member opposite 103'.

A pair of rectilinear, parallel guide rails 29 are integral with the surface of a guide plate 26 and extend along its length. Inwardly facing parallel grooves 31, cut into the edges of the rails, form a track. A tool support plate 37, having appropriately sized and arranged mounting holes or other attachment means such as clamping brackets to accommodate a router or other cutting tool, is dimensioned to fit into the grooves 31 and to slide back and forth therealong. An elongate aperture 39 in the guide plate 26, whose longitudinal axis is parallel to the grooves, receives the downwardly protruding cutting blade of the power tool (not shown) so that the blade can contact the underlying workpiece, and the tool can be slid on plate 37 along the grooves 31 to execute a cut in the workpiece. The length of travel of the support plate 37 along the grooves 31 is defined by positionable stops 41, each of which comprises a pair of parallel, horizontally oriented bars 42, 44 joined by bolts 45 which protrude upwardly through the parallel bars and receive wing nuts 47. The bottom bar 42 fits into the grooves 31 in the same manner as the tool support plate 37, while the top bar 44 rides on the top surfaces of the rails 29. Loosening the wing nuts 47 allows the stops to be moved to selected positions along the rails 29. Once at this position, the wing nuts can be tightened until the bars 42, 44 firmly grip the rails 29.

Figure 6:
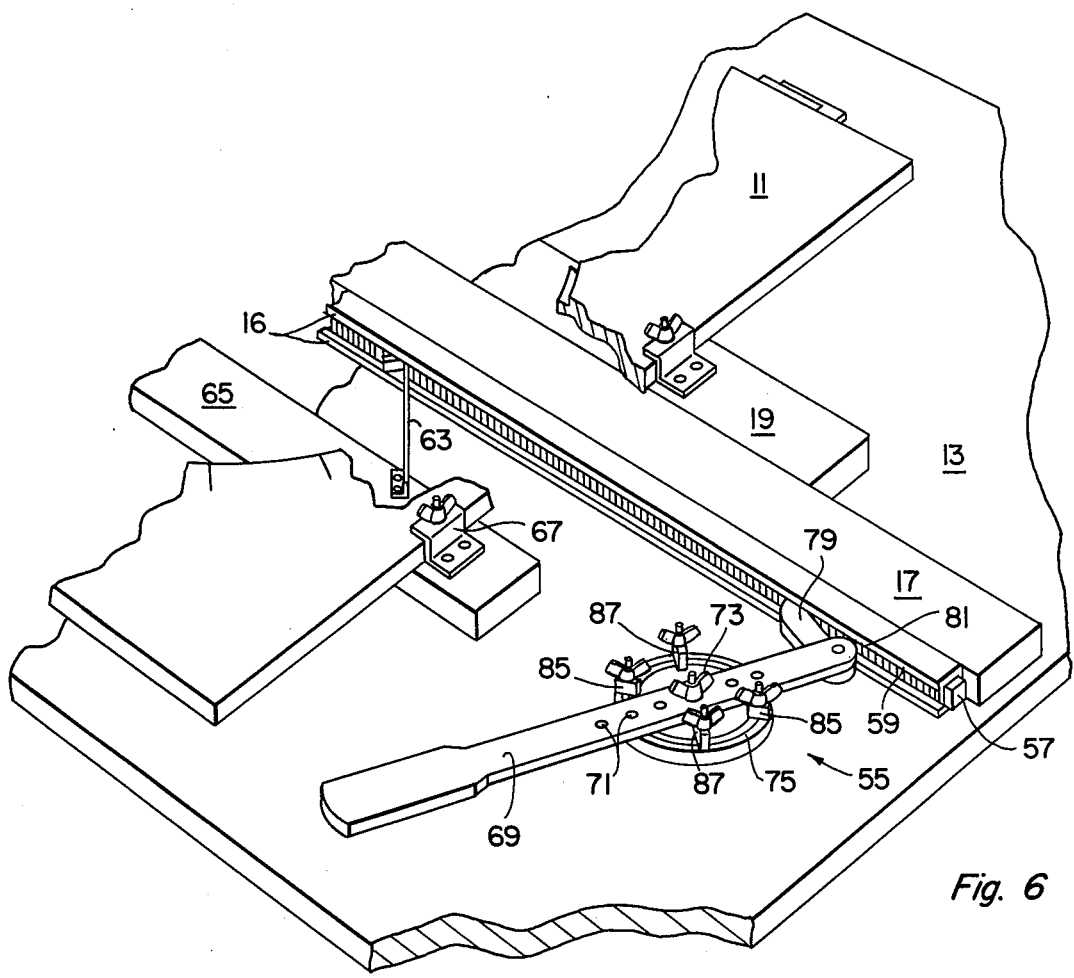
FIG. 6 is a detailed view of a preferred mechanism for incrementally moving a workpiece in relation to the cutting guide shown in FIG. 1.

Referring to FIG. 6, a preferred form of a mechanism for incrementally moving a workpiece along the fence 19 is shown. It comprises an extended rack 57 having regularly spaced serrations or notches 59 cut into a recessed surface extending along its length, and an associated ratchet arm 69 and pawl 79. The arm 69 pivots between adjustable stops 85, 87 on a bolt fitted with a wing nut 73. The arc of the arm may be adjusted by relocating stops 85 and 87 and by selecting an appropriate pivot point 71. In some situations, dependent on the width of the workpiece 17 and the location of the fence 19, the lever and stop mechanism may require relocation on surface 13. The pawl 79 is joined by a pin 81 to the end of the ratchet arm 69 and is forced outwardly, away from the pivot pin 73, by a torsion spring, into contact with the serrations 59 of rack 57. As the ratchet arm 69 is pivoted between initial and final positions, as defined by adjustable stops 85 and 87, the pawl 79 urges the rack 57 and the attached workpiece 17 a predetermined precise distance along the fence 19. The distance by which the workpiece is moved is determined by two parameters: first, the effective operating length of the ratchet arm 69, as determined by the particular mounting hole 71 being used, and second, the number of degrees through which the pivot arm rotates, as determined by adjustment of the stops 85, 87. The stops 85, 87 slide in a circular groove 89 in the surface of the ratchet plate and can be fixed at any location. The illustrated orientation of the pawl permits only right-to-left movement of the rack, but the pawl could be made so as to allow a 180 degree reversal of orientation and so permit movement in the opposite direction as well.

The rack and temporarily attached (e.g., by clamps as shown in FIG. 1) workpiece is urged toward the fence 19 by a spring arm 63 which bears resiliently against surfaces 16, spaced outwardly from serrations 59, on rack 57. Preferably, spring arm 63 is carried on an elongate bar 65 which, like fence 19, can be positioned as desired and fixed by means of clamps such as clamp 67.

Figure 7:
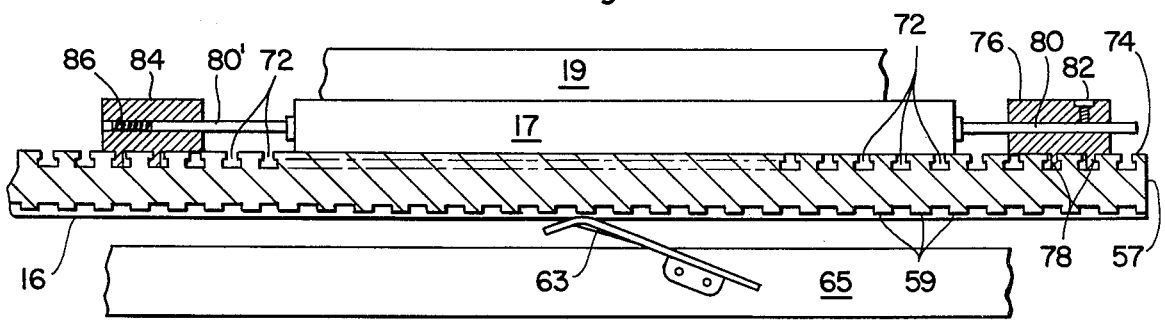
FIG. 7 is a detailed view, partially in cross section, of a mechanism useful for fixing a workpiece to the rack shown in FIG. 1.

Referring to FIG. 7, a cross-sectional view illustrating clamping means for securing the rack and workpiece together is shown. The rack 57 has a plurality of aligned slots 72 formed in its back face 74. A first clamping block 76 has a pair of tabs 78 which interfit with slots 72. Block 76 features a longitudinal bore housing a shaft 80 which may be fixed in position by tightening set screw 82. A second clamping block 84 is of identical construction to block 76, except that its shaft 80' is urged outwardly by a spring 86. Thus, a workpiece 17 may be positioned against the back face 74 of rack 57 and urged against shaft 80'. The tabs 78 of block 76 are then fitted within slots 72, its shaft 80 is pressed against workpiece 17, and the set screw 82 is tightened to secure the workpiece in position. The workpiece and rack are then positioned against the fence 19, and the elongate bar 65 carrying spring arm 63 is positioned so as to maintain contact between the workpiece and fence.

In operation, to produce a series of parallel slots in an elongate workpiece, the workpiece is fastened to rack 57 and positioned against fence 19. After spring arm 63 is moved into position, stops 85 and 87 are adjusted to set the ratchet mechanism 55 to move the workpiece a selected incremental distance along fence 19. Next, frame 11 is lowered to its operative position. The angle relative to the longitudinal axis of the workpiece of the slots to be formed is set by rotating the moveable members 103 within the circular track 97 and thereafter tightening wingnuts 100. Next, stops 115 are tightened to secure the position of the power tool mounting 118 along rods 111. The length of the slots to be formed is determined by positioning stops 110 such as to allow a selected amount of sliding movement therebetween of the tool mounting 118. The depth of the slots to be formed is determined by adjusting the length of the bit 139 which protrudes from the bottom of router 91 (see FIGS. 2 and 3). A slot is then formed by lowering the power tool and its attached support plate into the cutting position shown in FIG. 3, and moving the power tool along parallel rods 105 between the stops 110. On completion of the cut, the power tool is elevated out of contact with the workpiece and lever 69 is pivoted to incrementally move the workpiece 17 along fence 19. These operations are repeated until the desired number of identical parallel slots are produced.

With respect to the form of the guide assembly shown in FIG. 5, the length of the slots to be produced is set by fixing stops 41 at a selected position along guide rails 29. Slots are formed by pivoting the guide assembly 25' about hinges 27 into the cutting position (illustrated).

To form arcuate cuts or grooves, or to cut circular pieces from a workpiece, the stops 110 and 115 (FIG. 1) or stops 41 (FIG. 5) are set so as to preclude rectilinear motion of the tool support plate. The workpiece is cut by rotating rotatable members 103 within track 97.

The 360 degree rotation of the rotatable members 103 coupled with the rectilinear motion afforded by the orthogonal movements of the tool mounting 118 along guide rods 105 and 110 allow the cutting bit of the power tool to assume an extensive number of orientations relative to the workpiece without having to reposition the workpiece. These features enhance the repeatability and accuracy of cuts made with the cutting guide and broaden its versatility. Thus, the invention permits cuts to be made tangent to or intersecting a circle at a full range of angles and even makes possible the cutting of regular polygons. By setting stops 115 so as to allow motion of tool mounting 118 along rods 111, grooves or slots of widths greater than the diameter of the bit 139 can be made without changing the router bit and without moving the workpiece. The guide allows the router to behave as a drill, forming circular holes in the workpiece limited in diameter only by the diameter of the bit itself. Of course an edge of a workpiece may be shaped with specialized bits merely by setting the guide in a fixed position and manually moving the workpiece along fence 19.

The precision of the cutting guide allows the workpiece to be removed temporarily and replaced at a later time, and any additional cuts will be made with the same spacing and parallelism. Alternatively, a succession of identically sized workpieces could be fitted into the guide and be cut in the identical manner, because of the inherent repeatability of the device. Thus, it can be appreciated that the operator can quickly make, for example, a pair of side pieces for a louvered panel.

As various changes could be made in the embodiments set forth above without departing from the scope of the invention, it should be understood that all matter contained in the above description or shown in the accompanying drawings shall be interpreted as illustrative and not in a limiting sense, and that other embodiments are within the following claims.

What is claimed is:

1. A cutting tool guide apparatus for placement on a work surface and for moving a cutting tool between:
   a first position elevated above the work surface and disengaged from a workpiece to be cut; and
   a second position below said first position for engaging the tool with the workpiece, said apparatus comprising:
   a frame comprising a circular track;
   a rotatable member mounted for rotation on said track;
   a guide assembly mounted on said rotatable member, said guide assembly comprising:
   a rectilinear guide member joined to and rotatable in conjunction with the rotatable member;
   tool support means slidable engaging said guide member; and
   stops for defining the limits of sliding movement of said tool support means along said rectilinear guide member; and
   means for moving said tool support between said first and second positions.

2. The guide apparatus as set forth in claim 1 wherein said means for moving comprises a plurality of spring-loaded interfitting pins and barrels.

3. The guide apparatus as set forth in claim 1 wherein said means for moving comprises at least two scissors braces each of which comprises a pair of elongate support members, one end of each of said support members being hingedly mounted and the opposite end being slideably mounted.

4. The guide apparatus as set forth in claim 1 comprising two pairs of rectilinear guide members arranged orthogonally.

5. The guide apparatus as set forth in claim 1 including means for fixing said guide assembly in a selected angular position relative to said frame and indicia for determining the angular orientation of said moveable member.

6. The guide apparatus as set forth in claim 1 including means for repeatedly incrementally moving a workpiece by a preset distance relative to said frame.

7. The guide apparatus as set forth in claim 1 wherein said guide assembly includes hinges joined to said rotatable member, said hinges comprising said means for moving.

8. The guide apparatus as set forth in claim 1 wherein said frame includes hinges for connection with a work surface.

9. The guide apparatus as set forth in claim 1 further comprising means for urging said support plate to a position away from said workpiece unless a counteracting force is applied to said cutting tool for the purpose of making a cut.

10. The guide apparatus as set forth in claim 9 further comprising means for selectively overcoming said urging means so as to maintain said cutting tool in a cutting position.

11. The guide apparatus as set forth in claim 6 wherein said incrementally moving means comprises:
    a rack for connection to said workpiece;
    a pivotable ratchet arm having a pawl capable of engaging said rack; and
    means for adjustably setting the limits of an arc through which said arm can pivot, whereby said rack is advanced a fixed distance.

12. The guide apparatus as set forth in claim 11 including a workpiece holding means comprising a fence and a resilient arm which bears against said rack so as to press said workpiece against said fence.

* * * * *